(12) United States Patent
Badiru et al.

(10) Patent No.: US 9,909,954 B2
(45) Date of Patent: Mar. 6, 2018

(54) SYSTEM AND METHOD TO QUANTIFY VISCOUS DAMPING STEERING FEEL OF A VEHICLE EQUIPPED WITH AN ELECTRIC POWER STEERING SYSTEM

(71) Applicant: GM GLOBAL TECHNOLOGY OPERATIONS LLC, Detroit, MI (US)

(72) Inventors: Ibrahim A. Badiru, Novi, MI (US); Nathan M. Picot, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 155 days.

(21) Appl. No.: 14/991,238

(22) Filed: Jan. 8, 2016

(65) Prior Publication Data

US 2017/0199102 A1   Jul. 13, 2017

(51) Int. Cl.
  *G01M 17/04* (2006.01)
  *B62D 65/00* (2006.01)
  *B62D 6/00* (2006.01)

(52) U.S. Cl.
  CPC .............. *G01M 17/04* (2013.01); *B62D 6/00* (2013.01); *B62D 65/00* (2013.01)

(58) Field of Classification Search
  CPC .......... G01M 17/04; B62D 65/00; B62D 6/00

USPC ......................................................... 701/410
  See application file for complete search history.

(56) References Cited

PUBLICATIONS

Ibrahim A. Badiru; "Customer Focus in EPS Steering Feel Development"; SAE International; SAE Int. J. Passeng. Cars—Mech. Syst. / vol. 7, Issue 3 (Sep. 2014); 7(3):2014, doi:10.427/2014-01-0148.

*Primary Examiner* — Brian P Sweeney
(74) *Attorney, Agent, or Firm* — Quinn IP Law

(57) ABSTRACT

A method of quantifying a viscous damping steering feel characteristic of a vehicle equipped with an electric power steering system includes connecting the electric power steering (EPS) system to a rotary actuator and kingpin actuators of a simulator system, communicating a triangle wave control input from a simulator controller to the rotary actuator, and receiving outputs from sensors in the simulator system by the simulator controller in response to the triangle wave control input. The simulator controller is programmed to execute logic embodying a method using the triangle wave control input provided via the rotary actuator and deconvolution of the outputs remove phase lag between the input and output signals, to generate a deconvoluted hysteresis loop for each of a plurality of steering cycles conducted during a vehicle simulation event, and to characterize a viscous damping steering feel characteristic of the EPS system.

20 Claims, 3 Drawing Sheets

SYSTEM AND METHOD TO QUANTIFY VISCOUS DAMPING STEERING FEEL OF A VEHICLE EQUIPPED WITH AN ELECTRIC POWER STEERING SYSTEM

TECHNICAL FIELD

The disclosure generally relates to a system and a method of quantifying viscous damping steering feel of a vehicle equipped with an electric power steering system.

BACKGROUND

A vehicle may be equipped with an electric power steering system. The electric power steering system uses an electric motor to assist the driver of the vehicle in turning the wheels of the vehicle. Sensors detect the angular position and torque of the steering shaft and/or steering wheel, as well as the current operating conditions of the vehicle, and a steering microcontroller commands an assistive torque via the motor, to decrease the amount of torque that the driver must apply to turn the steering wheel, and thereby turn the wheels of the vehicle. The steering microcontroller is calibrated such that a varied amount of assistive torque is applied with the sensed operating conditions of the vehicle and thereby provides a desired steering feel to the vehicle operator.

One component of steering feel is hysteresis feel. Hysteresis feel can be described as the differences in driver applied steering torque required when steering the steering wheel away from center and returning the steering wheel to center, where center corresponds to a steering angle of zero. Hysteresis feel is the combined result of steering friction, steering inertia effects, and steering wheel velocity damping, also referred to herein as viscous damping. At low steering velocities, for example, at steering wheel velocities less than 45 degrees per second, friction is the main source of hysteresis. As steering velocities approach higher magnitudes, for example, as steering velocities approach 90 degrees per second, damping and inertia begin to add significant amounts to hysteresis feel. While generally friction is viewed as a negative for steering system components, some level of overall system hysteresis is required throughout the driving regime to provide a natural steering feel. With too little hysteresis the steering has a tendency to feel like a rotational spring. Inadequate hysteresis also limits how much steering effort progression is acceptable, e.g., the amount of driver steering torque required to maintain a given steering angle may be too high.

Calibrating the electric power steering system to provide the desired level of system hysteresis, including viscous damping, through the driving regime, is typically done during vehicle development based on subjective assessment due to the difficulty in mathematically modelling electric power steering systems at a sufficient level of accuracy to quantify these characteristics. Additionally, published objective steering metrics, predominantly based on sinusoidal steering inputs such as on-center and pulse steer tests, do not quantify all key steering feel characteristics, including, for example, viscous damping steering feel. Accordingly, subjective evaluation is used for the development of viscous damping steering feel, where this subjective methodology is disadvantaged by increased time for assessment, the prerequisite building of expensive physical testing vehicles, the limitations in the scope of conditions which can be assessed in a limited number of testing vehicles relative to modeled systems, and relatively less repeatability as compared with testing conducted in a laboratory environment and using a modeled system.

SUMMARY

A system and method to quantify viscous damping steering feel of an electric power steering (EPS) system of a vehicle is provided. The system, which is a hardware-in-the-loop (HIL) simulator system, includes a test bench composed of a rotary actuator, kingpin actuators, position and load transducers that are operable to support an electric power steering system, and apply input forces to the electric power steering system in response to a control input to simulate movement of a vehicle including vehicle operating conditions. The system includes a simulator controller disposed in electrical communication with the rotary actuator, kingpin actuators, position and load transducers.

The simulator controller is operable to communicate the control input to the hydraulic machine, and receive a sensed steering response from the electric power steering system. The simulator controller includes a processor, and non-transitory memory on which are recorded computer-executable instructions, including a simulator algorithm and a vehicle dynamics mathematical model. The vehicle dynamics mathematical model models the operating characteristics of a specific vehicle. The simulator algorithm is operable to reference the vehicle dynamics mathematical model, and generate the control input therefrom, which simulates the movement and operation of that specific vehicle for specific operating conditions.

In an illustrative example, the system for quantifying the viscous damping steering feel characteristic of an electric power steering (EPS) system includes an EPS gear connected to a steering shaft. The simulator system includes a test bench and a simulator controller. As part of the test bench, a rotary actuator is connected to the EPS gear via the steering shaft, and kingpin actuators are connected via rocker arms. The simulator controller is programmed to transmit a steering control input to the rotary actuator to rotate the steering shaft through a plurality of steering cycles in response to the steering control input, where the steering control input is a triangle wave defining the plurality of steering cycles. The simulator controller receives, from the test bench including the rotary actuator, a steering torque output, a steering angle output, and a lateral acceleration output corresponding to the steering control input, during rotation of the steering shaft through each of the plurality of steering cycles. The steering control input includes a steering angle input and a lateral acceleration input, where the lateral acceleration input is zero when the steering angle input is zero and steering wheel velocity at center is defined by a rotational velocity of the steering shaft when the steering angle input is zero. The simulator controller is programmed to determine the steering wheel velocity at center corresponding to the steering control input for each of the plurality of steering cycles, and to vary the steering control input such that the plurality of steering cycles includes steering cycles generating a range of values of the steering wheel velocity at center. The rotary actuator includes a steering wheel angle sensor, and the EPS gear including an EPS steering angle sensor, such that the simulator controller receives the steering angle output from at least one of the steering wheel angle sensor and the EPS steering angle sensor.

The simulator controller is programmed to associate the steering torque output, the steering angle output, and the lateral acceleration output received during each of the plurality of steering cycles with the corresponding steering control input for corresponding one of the plurality of steering cycles, to group the associated data of the plurality of steering cycles into a plurality of data groups, where each data group is defined by a common calculated mean steering control input, to compare each of the plurality of data groups to an idealized input profile for the data group, to identify whether the data group includes a disqualifying steering cycle, to remove data associated with the disqualifying steering cycle from the data group, to apply a data filter to the remaining data in the data group, to generate filtered data, and to apply at least one correction factor to the filtered data to correct the filtered data for a vehicle center of gravity, to generate corrected data.

The simulator controller is further programmed to determine the phase shift time between the lateral acceleration output and the steering angle output in each steering cycle of the plurality of steering cycles; deconvolute each steering cycle to remove the phase shift time between the lateral acceleration output and the steering angle output for that steering cycle; generate a deconvoluted hysteresis curve for each steering cycle; determine, using the deconvoluted hysteresis curve for each steering cycle, a counter-clockwise (CCW) steering torque at zero and a clockwise (CW) steering torque at zero for the respective steering cycle; associate the determined CCW steering torque at zero and the determined CW steering torque at zero for the respective steering cycle with the steering wheel velocity at center determined for that respective steering cycle; calculate, for each of a plurality of predetermined values of steering wheel velocity at center, an average CW steering torque at zero and an average CCW steering torque at zero; and identify a best fit model using the average CW steering torque at zero, the average CCW steering torque at zero, and the corresponding predetermined value of the steering wheel velocity of center of the plurality of predetermined values of steering wheel velocity at center, where the best fit model quantifies the viscous damping steering feel characteristic of a vehicle including the EPS system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
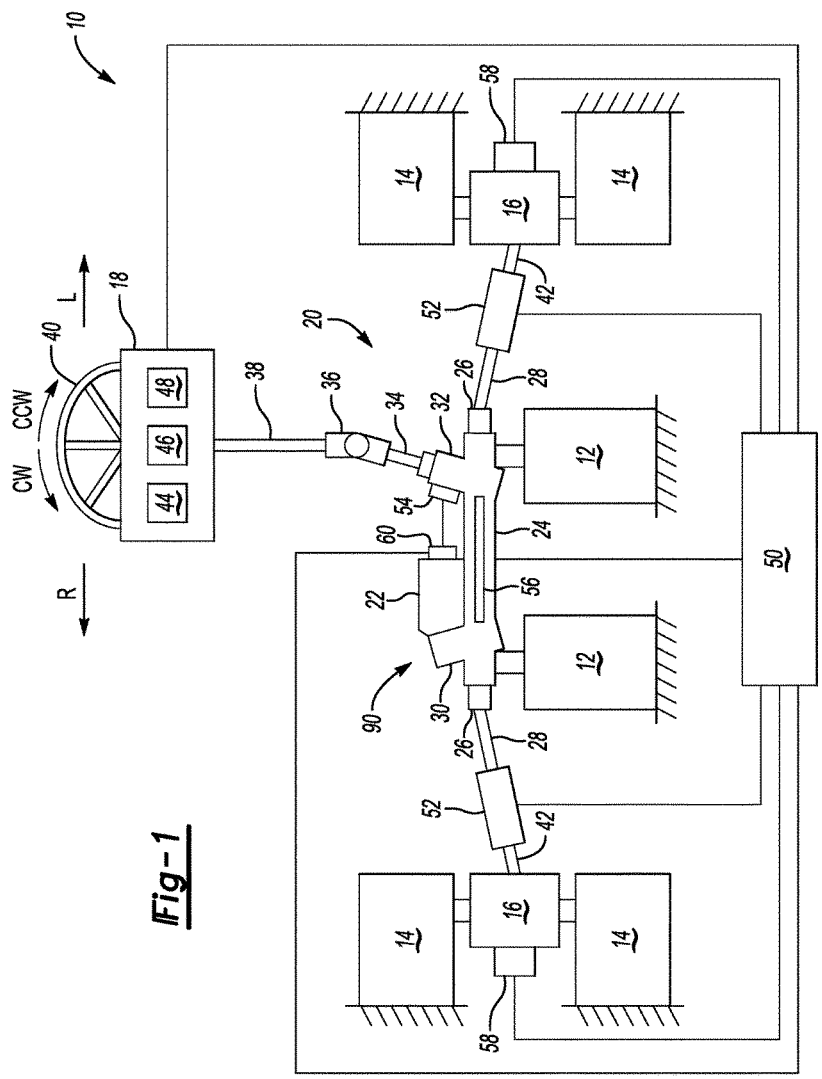
FIG. 1 is a schematic diagram of a simulator system, including a simulator controller, a rotary actuator, and kingpin actuators for providing control inputs into an electric power steering system installed into the simulator system and for receiving outputs from the system for quantifying steering feel characteristics of the electric power steering system.

Referring to the Figures, wherein like numerals indicate like parts throughout the several views, a simulator system is generally shown at 10 in FIG. 1. The simulator system 10 is a hardware-in-the-loop (HIL) simulator system used for quantifying the viscous damping steering feel characteristic of a vehicle equipped with an electric power steering system, where the simulator system 10 includes hardware comprising an electric power steering system 20. The simulator system 10 provides control input, including steering input and vehicle operating condition input, to the electric power steering system 20. The electric power steering (EPS) system 20, which may also be referred to herein as an EPS system 20, includes an electric power steering gear assembly 90, which may also be referred to herein as an EPS gear 90. The simulator system 10 includes a rotary actuator 18 for inputting steering input into the EPS gear 90 by actuation of a steering wheel 40 and steering shaft 38, where the steering wheel 40 is connected to the EPS gear 90 via the steering shaft 38, intermediate shaft 36, and pinion shaft 34, as shown in FIG. 1. The simulator system 10, in the example shown, includes right and left kingpin actuators 58 for inputting simulated vehicle and road inputs into the EPS system 20 by actuation, respectively, of right and left kingpin assemblies 16 of the EPS system 90, and further includes right and left load transducers 52 for inputting simulated road inputs into the EPS gear 90 by loads introduced into, respectively, right and left inner tie rods 28 of the EPS system 20. The simulator system 10, in the example shown, includes gear supports 12 and kingpin supports 14 for mounting the EPS system 20 during simulation testing and evaluation.

"Right" and "left" as used herein in describing elements of the simulator system 10 and elements of the EPS system 20 refer to "right" and "left" as perceived by a driver operating the steering wheel 40, as would be typically used in automotive terminology when referring to a right side and a left side of a vehicle, and as shown on FIG. 1 by the arrow labeled R indicating "right" and the arrow labeled L indicating "left" with reference to the simulator system 10 and EPS system 20. "Counter-clockwise" (CCW) and "clockwise" (CW) as those terms are used herein to describe directions of rotation of the steering wheel 40, are from the perspective of a driver operating the steering wheel 40, and as shown on FIG. 1 by the arrow labeled CCW illustrating a counter-clockwise direction of rotation of the steering wheel 40 and the arrow labeled CW illustrating a clockwise direction of rotation of the steering wheel 40. In typical vehicle operation, the steering wheel 40 is rotated in a clockwise (CW) direction, e.g., to the right, to provide a steering angle (SA) input to the EPS gear 90 as to turn the vehicle in a right direction, and is rotated in a counter-clockwise (CCW) direction, e.g., to the left, to provide an input to the EPS gear 90 as to turn the vehicle in a left direction.

The simulator system 10 includes a simulator controller 50 which is programmed to execute logic embodying a method 100 (see FIG. 6) using control inputs provided via the rotary actuator 18, the kingpin actuators 58, and the load transducers 52 to the EPS system 20, and to receive outputs from sensors in the simulator system 10 and EPS system 20. Execution of the method 100 results in the characterization of a viscous damping steering feel characteristics of the EPS system 20, as set forth below with reference to FIGS. 2-5.

The rotary actuator 18 includes a steering wheel torque sensor 44 for sensing steering torque (ST) of the steering wheel 40 during a simulation event, where a simulation event includes at least one steering cycle. The rotary actuator 18 further includes a steering wheel velocity sensor 46 for sensing steering wheel velocity (SV) and a steering wheel angle sensor 48 for sensing the steering wheel angle (SA), as the steering wheel is rotated by the rotary actuator 18. The steering wheel angle may be referred to herein as the steering angle (SA). As referred to herein, the steering wheel 40 is at center when the steering angle is zero (SA=0), corresponding to the wheels of the vehicle being positioned in a straight forward condition. As illustrated graphically in FIGS. 2-3B, the steering angle with the steering wheel at center is zero (SA=0), steering angle due to clockwise rotation of the steering wheel 40 to the right of center ($SA_R$) is depicted graphically in a positive direction, and steering angle due to counter-clockwise rotation of the steering wheel 40 to the left of center ($SA_L$) is depicted graphically in a negative direction.

A "steering cycle" as that term is used herein, refers to a sequence of steering wheel movements consisting of rotation of the steering wheel 40 from the center (SA=0) in a first direction to a first predetermined position followed by rotation of the steering wheel 40 in a second direction opposing the first direction, from the first predetermined position through center to a second predetermined position, followed by rotation of the steering wheel 40 in the first direction to return the steering wheel to center. In one example, a steering cycle can include a sequence of steering wheel movements consisting of rotating the steering wheel 40 and the attached steering shaft 38 from center in a clockwise (CW or right) direction to a first predetermined steering angle, rotating the steering wheel 40 counter-clockwise (CCW or left) from the first predetermined steering angle through center to a second predetermined steering angle, then rotating the steering wheel 40 clockwise (CW or right) to return the steering wheel to center (SA=0).

In the example shown in FIG. 1, the EPS gear 90 includes a steering gear rack 26 having right and left ends coupled respectively to right and left inner tie rods 28. The right and left inner tie rods 28 are connected, respectively, to right and left kingpin assemblies 16 via right and left outer tie rods 42. The kingpin actuators 58 actuate the kingpins 16 as commanded by the simulator controller 50 and the load transducers 52 provide load inputs as commanded by the simulator controller 50, to simulate vehicle and operating inputs to the EPS system 20 and EPS gear 90 via the kingpins 16 and the inner and out tie rods 28, 42.

The EPS gear 90 includes a housing 24 which houses the rack 26 and at least one pinion (not shown). The pinion is meshingly engaged with the rack 26 such that rotation of the pinion in response to a change in steering angle due to rotation of the steering wheel 40 and steering shaft 38 causes a corresponding lateral movement of the rack 26 which is translated to the steering linkage, including the inner and outer tie rods 28, 42 and kingpin assemblies 16, to effect steering of a vehicle including the EPS system 20 in a direction and magnitude corresponding to the inputted steering angle. The EPS gear 90 includes a lateral displacement sensor 56 to sense lateral displacement of the rack 26. The lateral displacement sensor 56 outputs a displacement signal to the simulator controller 50, which can be used by the simulator controller 50 in conjunction with input received from the kingpin actuators 58 to determine lateral acceleration (LA) during a simulation event. In one example, the lateral displacement sensor 56 is configured as a linear variable displacement transducer (LVDT).

In the example shown, the housing 24 includes a first pinion housing 30 and a second pinion housing 32. Each of the pinion housings 30, 32 houses a pinion (not shown) which is meshingly engaged with the rack 26. The pinion may also be known as a pinion gear. The pinion in the second pinion housing 32 is rotationally driven by the pinion shaft 34, which is connected via the intermediate shaft 36 to the steering shaft 38, such that the pinion shaft 34 is rotated by rotation of the steering wheel 40 and steering shaft 38, to engage the rack 26 to cause a corresponding lateral movement of the rack 26. The pinion in the second pinion housing 32 may be referred to herein as a shaft-driven pinion. The EPS gear 90 includes an EPS steering angle sensor 54, which may be mounted, for example, on the second pinion housing 32, for measuring the steering angle at the pinion and/or the pinion shaft, and outputting a steering angle signal to the EPS controller 60 for use in actuating rotation of the pinion in the first pinion housing 30, and to the simulator controller 50.

The pinion in the first pinion housing 30 is rotationally driven by an electric motor 22, also referred to herein as a EPS motor 22, in response to a control signal outputted by the EPS controller 60, to engage the rack 26 to cause a corresponding lateral movement of the rack 26. The EPS controller 60 outputs the control signal to the EPS motor 22 in response to steering angle input received from the EPS steering angle sensor 54 and from the steering wheel angle sensor 48, where the EPS controller 60 includes algorithms as required to compare and reconcile the steering angle inputs received from the EPS steering angle sensor 54 and the steering wheel angle sensor 48, to generate a control signal to the EPS motor 22 corresponding to the rotation of the steering wheel 40. The example shown in FIG. 1 is non-limiting, and it would be appreciated that the EPS system 20 can be configured with a single pinion housing which houses a single pinion, where the single pinion can be driven by the pinion shaft 34 and the electric motor 22, and/or by the pinion shaft 34 only, as commanded by the EPS controller 60.

The EPS controller 60 may be incorporated into one of the components of the EPS gear 90, such as the housing 24 or motor 22. Alternatively, the EPS controller 60 may be located distant from the EPS system 20, and only connected in electronic communication with the various components of the EPS system 20. The EPS controller 60 may include a control module or a computer that is operable to control the operation of the EPS system 20. The EPS controller 60 may include a processor, and all software, hardware, memory, algorithms, connections, sensors, etc., necessary to manage and control the operation of the EPS system 20. It should be appreciated that the EPS controller 60 may include any device capable of analyzing data received from various sensors, comparing the data, making the necessary decisions required to control the operation of the EPS system 20, and executing the required tasks necessary to control the operation of the EPS system 20.

The EPS controller 60 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics. The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The EPS controller 60 includes tangible, non-transitory memory on which are recorded computer-executable instructions, including a steering assist selection algorithm. The processor of the EPS controller 60 is configured for executing the steering assist selection algorithm. The steering assist selection algorithm implements a method of selecting a value for a steering setting to be applied to assist an operator in turning the vehicle using the steering wheel 40. The steering setting may include or otherwise be defined as an assist torque. The steering assist selection algorithm can reference a calibration table to define a value of the steering setting, based on current operating conditions. Accordingly, a calibration table may be stored in a memory device of the EPS controller 60 in the form of a data file or the like.

The simulator controller 50 is disposed in electrical communication with the rotary actuator 18, the kingpin actuators 58, the load transducers 52, the lateral displacement sensor 56, the EPS steering angle sensor 54, and the EPS controller 60. The simulator controller 50 is operable to communicate control inputs, such as steering wheel steering angle (SA), steering wheel torque (ST), and steering wheel velocity (SV) to the EPS system 20 via the rotary actuator 18 connected to at least one of the steering wheel 40 and the steering shaft 38, the kingpin actuators 58 and the load transducers 52 and to receive a sensed steering response from the EPS system 20, including, for example, output signals received from the EPS controller 60, the lateral displacement sensor 56, the EPS steering angle sensor 54. The simulator controller 50 further receives signals from the steering wheel torque sensor 44, the steering wheel velocity sensor 46, and the steering wheel angle sensor 48. The simulator controller 50 and the EPS controller 60 may communicate in any suitable manner, such as through a high-speed communication protocol.

The simulator controller 50 may include a computer or other similar device that is operable to control the operation of the rotary actuator 18, the kingpin actuators 58 and the load transducers 52. The simulator controller 50 may include a processor, and include all software, hardware, memory, algorithms, connections, sensors, CAN communication modules, etc., necessary to manage and control the operation of the rotary actuator 18, the kingpin actuators 58 and the load transducers 52. As such, a method of quantifying the viscous damping steering feel of a vehicle equipped with EPS system 20, described below, may be at least partially embodied as a program operable on the simulator controller 50. It should be appreciated that the simulator controller 50 may include any device capable of analyzing data from various sensors, comparing data, making the necessary decisions required to control the operation of the rotary actuator 18, the kingpin actuators 58 and the load transducers 52, and executing the required tasks necessary to control the operation of the rotary actuator 18, the kingpin actuators 58 and the load transducers 52.

The simulator controller 50 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics. The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory. The simulator controller 50 may include tangible, non-transitory memory on which are recorded computer-executable instructions, including but not limited to a simulator algorithm and a vehicle dynamics mathematical model executable by the processor of the simulator controller 50, to execute the method 100 shown in FIG. 6 and described herein.

Figure 2:
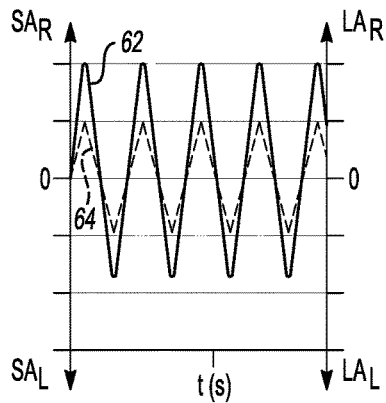
FIG. 2 is a representative time plot of a triangle wave steering angle input value and lateral acceleration input value inputted as control inputs by the vehicle simulator to the actuators of the simulator system of FIG. 1, with amplitude plotted on the vertical axis and time plotted on the horizontal axis.

As part of the method 100, the simulator controller 50 runs a test simulation by inputting a series of triangle way steering inputs at predefined discrete frequencies and amplitudes to actuate rotation of the steering wheel 40 and/or steering shaft 38. FIG. 2 is a representative time plot of a triangle wave steering angle (SA) input value and lateral acceleration (LA) input value inputted as control inputs by the simulator controller 50 to the rotary actuator 18 of the simulator system 10 of FIG. 1, with amplitude plotted on the vertical axes and time plotted on the horizontal axis. The control inputs SA and LA shown in FIG. 2 actuate rotation of the steering wheel 40 to the inputted steering angle SA at a steering wheel velocity (SV) to achieve the inputted lateral acceleration (LA). As shown in FIG. 2, steering angle input to the right of center is plotted as a positive value $SA_R$, and steering angle input to the left of center is plotted as a negative value $SA_L$. Likewise, the lateral acceleration input during steering angle input to the right of center is plotted as a positive value $LA_R$, and the lateral acceleration input during steering angle input to the left of center is plotted as a negative value $LA_L$, as shown on FIG. 2. When performing the method 100, the rotary actuator 18 actuates the steering wheel 40 in a controlled manner using the triangle wave steering input as shown in FIG. 2, such that, unlike a traditional sine wave input, constant steering velocity (SV) is maintained as the steering wheel 40 is rotated through center, e.g., as the steering wheel 40 is rotated through a steering angle equal to zero, and such that at center, the lateral acceleration input to the EPS system 20 is also zero. By performing the method 100 in this manner, steering damping torque is not convoluted with rotational inertia dynamic torque.

Figure 3A:
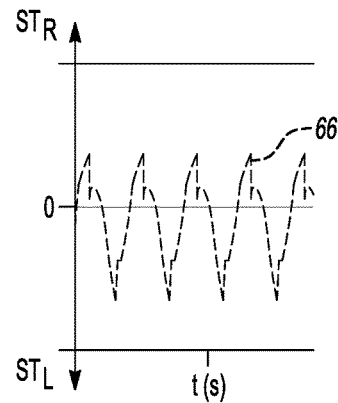
FIG. 3A is an example time plot of a steering torque output value generated in response to the triangle wave control inputs of FIG. 2, with amplitude plotted on the vertical axis and time plotted on the horizontal axis.

As part of the method 100, the simulator controller 50 receives sensed outputs from the rotary actuator 18 and from the EPS system 20 in response to the control inputs. FIG. 3A is an example time plot of a steering torque (ST) output value generated from sensor signals output from the steering wheel torque sensor 44 in response to the triangle wave control inputs of FIG. 2, with amplitude plotted on the vertical axis and time plotted on the horizontal axis. As shown in FIG. 3A, steering torque experienced during steering angle input to the right of center ($SA_R$) is plotted as a positive value $ST_R$, and steering torque experienced during steering angle input to the left of center ($SA_L$) is plotted as a negative value $ST_L$.

Figure 3B:
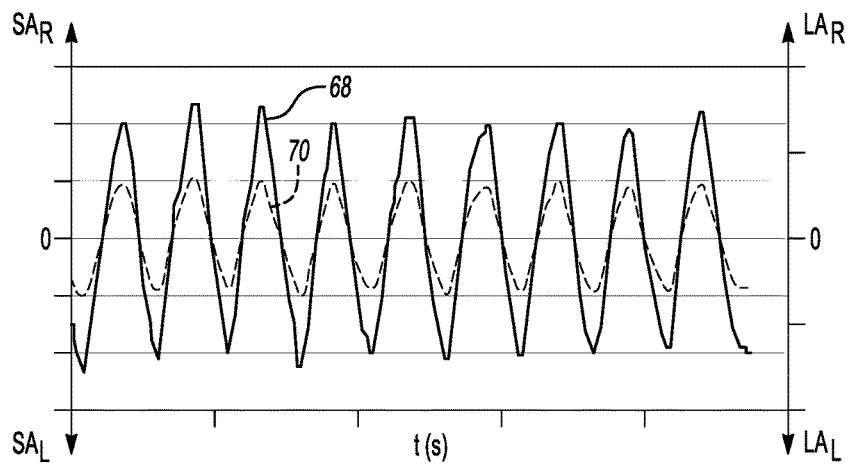
FIG. 3B is an example time plot of a steering angle output value and a lateral acceleration output value generated in response to the triangle wave control inputs of FIG. 2, with amplitude plotted on the vertical axis and time plotted on the horizontal axis.

FIG. 3B is an example time plot of a steering angle (SA) output value and a lateral acceleration (LA) output value generated in response to the triangle wave control inputs of FIG. 2, with amplitude plotted on the vertical axis and time plotted on the horizontal axis. The steering angle output value (SA) generated in response to the triangle wave control inputs of FIG. 2 can be derived by the simulator controller 50 from, for example, output signals generated from the steering wheel angle sensor 48 and/or the EPS steering angle sensor 54, or a combination of these. The lateral acceleration (LA) output value generated in response to the triangle wave control inputs of FIG. 2 can be derived by the simulator controller 50 from, for example, output signals generated from the steering wheel velocity sensor 46 and/or the lateral displacement sensor 56, or a combination of these. As shown in FIG. 3B, steering angle output to the right of center is plotted as a positive value $SA_R$, and steering angle output to the left of center is plotted as a negative value $SA_L$. Likewise, the lateral acceleration output experienced during steering angle input to the right of center is plotted as a positive value $LA_R$, and the lateral acceleration output generated by steering angle input to the left of center is plotted as a negative value $LA_L$, as shown on FIG. 3B.

Figure 4A:
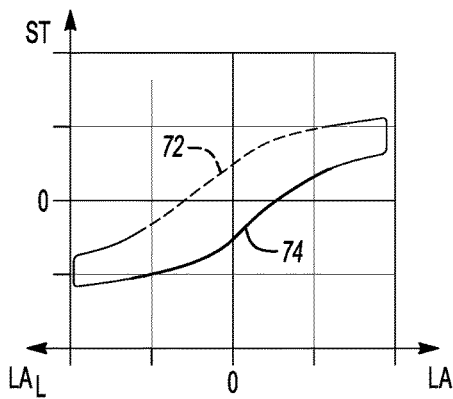
FIG. 4A is an example plot of a convoluted hysteresis loop of steering torque versus lateral acceleration, where the steering torque data is convoluted with vehicle dynamic behavior, with steering torque plotted on the vertical axis and lateral acceleration plotted on the horizontal axis.

FIG. 4A is an example plot of a hysteresis loop of steering torque versus lateral acceleration prior to deconvolution of the data by the method 100, where the steering torque data is convoluted with vehicle dynamic behavior. As shown in FIG. 4A, steering torque output (ST) is plotted on the vertical axis and lateral acceleration output (LA) is plotted on the horizontal axis, with the upper curve 72 (as it appears on the page) of the hysteresis loop representing steering torque versus lateral acceleration during counter-clockwise (CCW) rotation of the steering wheel 40 during a steering cycle, and the lower curve 74 (as it appears on the page) of the hysteresis loop representing steering torque versus lateral acceleration during clockwise (CW) rotation of the steering wheel 40. The hysteresis plot shown in FIG. 4A is disadvantaged by a convolution of the vehicle dynamic behavior with steering torque characteristics, resultant from a phase lag between input and output signals, for example, when the hysteresis loop is generated without deconvoluting the data as described by method 100.

Figure 4B:
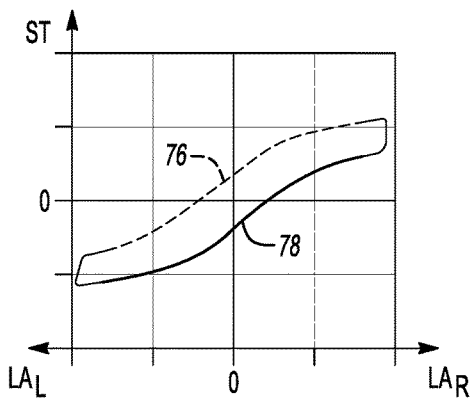
FIG. 4B is an example plot of a deconvoluted hysteresis loop of steering torque versus lateral acceleration, after deconvolution of the vehicle dynamic behavior from the steering torque data, with steering torque plotted on the vertical axis and lateral acceleration plotted on the horizontal axis.

FIG. 4B is an example plot of a deconvoluted hysteresis loop of steering torque versus lateral acceleration, after deconvolution of the vehicle dynamic behavior from the steering torque data. Similar to the plot shown in FIG. 4B, steering torque (ST) is plotted on the vertical axis and lateral acceleration (LA) is plotted on the horizontal axis with the upper curve 76 (as it appears on the page) of the hysteresis loop representing steering torque versus lateral acceleration during counter-clockwise (CCW) rotation of the steering wheel 40 during a steering cycle, and the lower curve 78 (as it appears on the page) of the hysteresis loop representing steering torque versus lateral acceleration during clockwise (CW) rotation of the steering wheel 40. The hysteresis plot shown in FIG. 4B is generated by deconvoluting the data using the method 100, to deconvolute the vehicle dynamic behavior from steering torque characteristics by aligning the steering angle before cross-plotting thus eliminating the phase lag between input and output signals to generate a more representative objective measure of damping performance as shown by the plot 80 of viscous damping steering feel characteristic (see FIG. 5) for a plurality of steering cycles executed by the simulator system 10, including the EPS system 20, during a simulation event controlled by the simulator controller 50.

Figure 5:
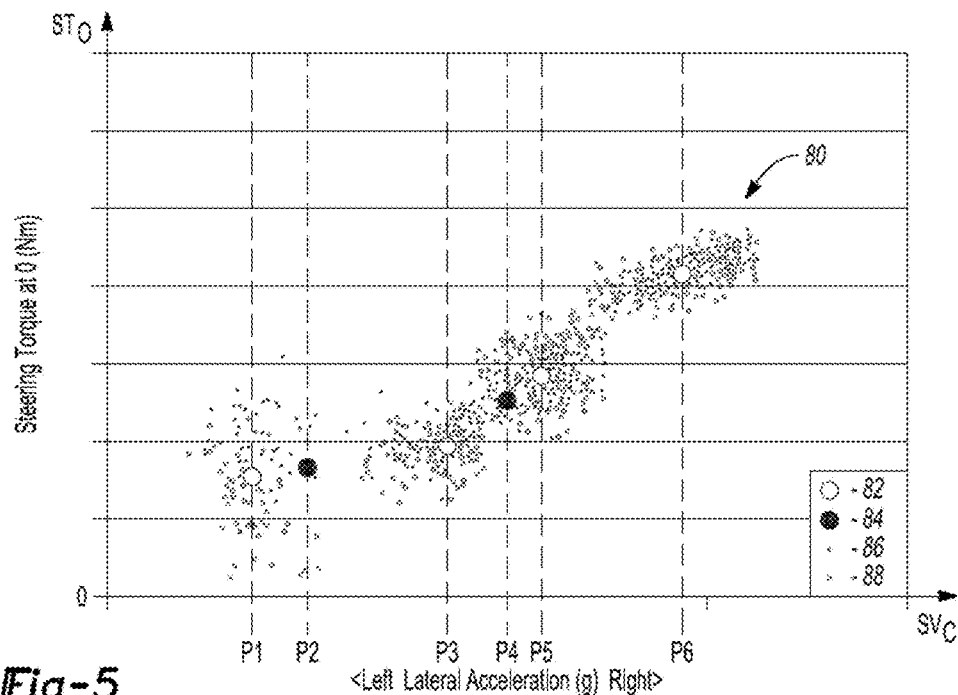
FIG. 5 is a representative plot of a viscous damping steering feel characteristic derived from the output values of FIGS. 3A and 3B and the deconvoluted hysteresis loop of FIG. 4B, with steering torque at a steering angle of zero degrees plotted on the vertical axis and steering wheel velocity through center plotted on the horizontal axis.

FIG. 5 is a representative plot 80 of a viscous damping steering feel characteristic derived from the output values of FIGS. 3A and 3B and the deconvoluted hysteresis loop of FIG. 4B generated for a plurality of steering cycles executed by the simulator controller 50 in a simulation event, where the steering cycles are performed with differing steering velocities through center. FIG. 5 shows steering torque at a steering angle of zero degrees ($ST_0$), also referred to herein as steering torque at zero, plotted on the vertical axis, and steering wheel velocity through center ($SV_C$), also referred to herein as steering velocity at center, plotted on the horizontal axis. Referring to FIG. 5, each respective one of the smaller solid dots 86 correspond to the steering torque (ST) in a counter-clockwise (CCW) direction as determined from the upper curve 76, and each respective one of the smaller hollow circles 88 correspond to the steering torque (ST) in a clockwise (CW) direction as determined from the lower curve 78, of the deconvoluted hysteresis loop of FIG. 4B, for a respective steering cycle performed with a respective value of steering velocity at center. Because the simulator controller 50 actuates the rotary actuator 18 to maintain a constant steering velocity through center as the steering wheel is rotated through a steering cycle, the lateral acceleration at center is zero, and the steering torque at zero plotted in FIG. 5 is derived from the steering torque shown in FIG. 4B at a lateral acceleration value of zero. Therefore, the plot 80 of FIG. 5 can be generated from a plurality of deconvoluted hysteresis plots such as the one shown in FIG. 4B, generated at various values of steering wheel velocities.

Referring to FIG. 5, each point P, including points P1, P2, P3, P4, P5, and P6, is a predetermined sampling point corresponding to a predetermined value of steering wheel velocity through center ($SV_C$). Each respective one of the larger solid dots 84 corresponds to an average of the CCW steering torque (ST) at zero values as determined from the upper curve 76 of hysteresis curves generated at a predetermined steering velocity at center ($SV_C$). For example, the two larger solid dots 84 shown in FIG. 5 correspond, respectively, to an average CCW steering torque (ST) at zero of a plurality of steering cycles executed at each of a respective value P2 and P4 of steering velocity at center. Likewise, each respective one of the larger hollow circles 82 corresponds to an average of the CW steering torque (ST) at zero values as determined from the upper curve 76 of hysteresis curves generated at a predetermined steering velocity at center ($SV_C$). For example, the four larger hollow circles 82 shown in FIG. 5 correspond, respectively, to an average CW steering torque (ST) at zero of a plurality of steering cycles executed at each of a respective value P1, P3, P5 and P6 of steering velocity at center. As described for method 100, the average values of CCW and CW steering torque at zero values can be best fit to determine parameters of a third order polynomial model to model the viscous damping steering feel characteristic of a vehicle simulated by the simulator system 10 and provided with the EPS system 20.

Figure 6:
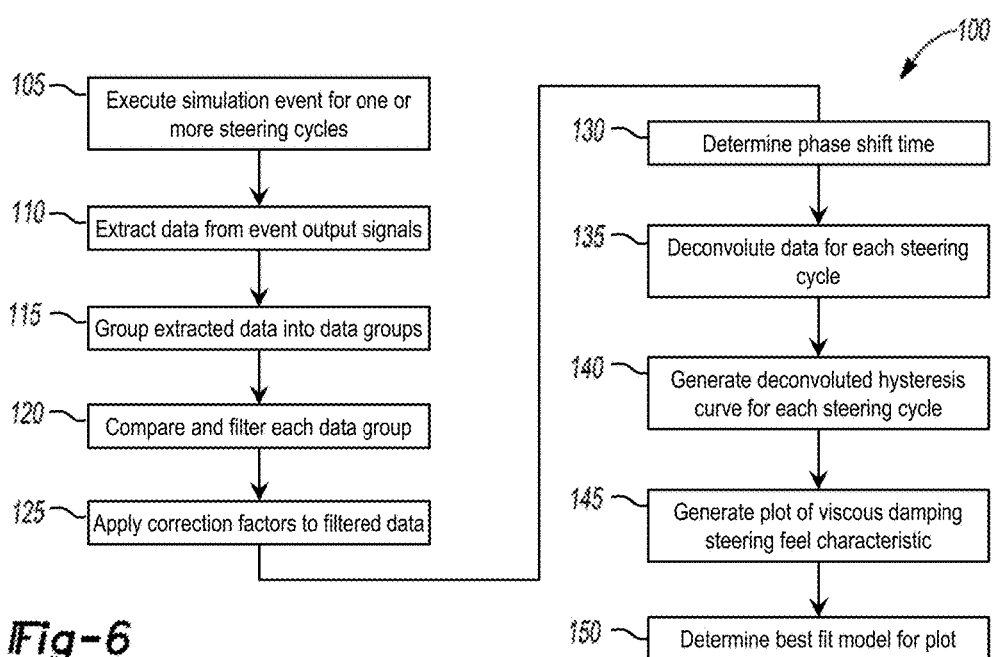
FIG. 6 is a flowchart of a method for quantifying the viscous damping steering feel characteristic of a vehicle equipped with electric power steering using the HIL simulator system of FIG. 1.

FIG. 6 is a flowchart of an example embodiment of the method 100 for quantifying the viscous damping steering feel characteristic 80 of a vehicle equipped with an EPS system 20, using the simulator system 10 of FIG. 1. Referring to the simulator system 10 shown in FIG. 1, and to the plots illustrated in FIGS. 2-4B, the method 100 includes, at step 105, the simulator controller 50 executing a simulation event using the simulator system 10 including an EPS system 20 operatively connected to the simulator system 10 as previously described herein. The simulation event includes the simulator controller 50 executing one or more steering cycles at each of a series of steering input levels, each steering input configured as a triangle wave control input of the type shown in FIG. 2, at predefined discrete frequencies and amplitudes. The predefined discrete frequencies and amplitudes can include combinations of lateral acceleration inputs 62 and steering angle inputs 64 which are representative, e.g., intended to generate, a range of steering wheel velocities at center, from which a corresponding range of steering torque outputs 66, lateral acceleration outputs 68 and steering angle outputs 70 can be sensed, and from which a corresponding range of steering torque at zero values can be determined by method 100. In the illustrative example, the steering cycles executed include combinations of lateral acceleration inputs 62 and steering angle inputs 64 to generate steering wheel velocities at center corresponding to the predetermined points P1, P2, P3, P4, P5 and P6 shown in FIG. 5. It would be understood that more or less than the predetermined points P shown in FIG. 5 could be used in best-fit modeling of the viscous damping steering feel characteristic, and as such the example is illustrative and non-limiting. The method then proceeds to step 110.

At step 110, the simulator controller 50 extracts data from the output signals received during each of the steering cycles executed during the simulation, to determine output data including steering torque output 66, lateral acceleration output 68, and steering angle output 70, and steering wheel velocity including steering wheel velocity at center, and associates the extracted output data with the corresponding control inputs 62, 64 for each of the executed steering cycles. The associated control inputs and output data for each steering cycle executed by the simulator controller 50 can be stored to the memory and available for further manipulation by the simulator controller 50 at step 115.

At step 115, the simulator controller 50 groups the output data of individual steering cycles into a plurality of groups, where each group is defined by a common calculated mean steering control input, defined, for example, by a common calculated mean frequency and amplitude of each of the lateral acceleration input and the steering angle input. The method then proceeds to step 120.

At step 120, each data group identified at step 115 is compared to an idealized input profile to verify the quality of the steering angle input, for example, to identify any steering cycles which represent disqualifying or non-normal test conditions, and to remove any data associated with a disqualifying or non-normal test condition from the data group. The simulator controller 50 then applies a data filter to the remaining data in the data group to reduce data noise. In a non-limiting example, the filter applied is a Butterworth filter. In a non-limiting example, the filter is a fourth ($4^{th}$) order Butterworth filter. The method then proceeds to step 125.

At step 125, the simulator controller 50 applies correction factors to the filtered output data to correct the output data for vehicle center of gravity. For example, the simulator controller 50 at step 125 corrects lateral acceleration output signals to the vehicle center of gravity, as determined by the simulator controller 50 during execution of the simulation event. The method then proceeds to step 130.

At step 130, the simulator controller 50 cross-correlates the filtered and corrected data from step 125, for each steering cycle, to determine the phase shift time between the lateral acceleration and steering angle output data streams, in preparation for deconvoluting the data. The method then proceeds to step 135.

At step 135, the simulator controller 50 deconvolutes the data for each steering cycle by performing a circulate-shift of the lateral acceleration output data 68 relative to the steering angle output data 70, to remove the time lag from the data for that steering cycle, as shown by the illustrative plot of output data 68, 70 from a steering cycle shown in FIG. 3B. The method then proceeds to step 140.

At step 140, the simulator controller 50 generates the deconvoluted hysteresis curve shown in FIG. 4B for each steering cycle. The simulator controller 50 then calculates the y-axis cross-over value for the CCW curve 78 to determine the value of the CCW steering torque at zero 86, and calculates the y-axis cross-over value for the CW curve 78 to determine the value of the CW steering torque at zero 88. The simulator controller 50 then associates the determined values 86, 88 of the CCW and CW steering torque at zero for the steering cycle with the steering wheel velocity at center determined for that steering cycle. The determined data can then be saved to memory.

The method then proceeds to step 145. At step 145, the simulator controller 50 uses the cumulative data generated at step 140 for the plurality of steering cycles to generate a plot 80 of viscous damping steering feel characteristic, as illustrated by the example shown in FIG. 5. The method then proceeds to step 150.

At step 150, the simulator controller 50 calculates the average CW steering torque at zero 82 and the average CCW steering torque at zero 84 for each of a plurality of predetermined values of steering wheel velocity at center SVc, shown at points P1 through P6 in the example plot 80 illustrated by FIG. 5. The simulator controller 50 then uses the average values 82, 94 to find parameters of a third order polynomial model that best fits the data points comprising plot 80, to quantify the viscous damping steering feel characteristic of a vehicle simulated by the simulator system 10 including the EPS system 20.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of quantifying a viscous damping steering feel characteristic of an electric power steering (EPS) system including an EPS gear connected to a steering shaft, the method comprising:
   transmitting a steering control input from a simulator controller to a rotary actuator;
   wherein the steering control input is configured as a triangle wave and includes a plurality of steering cycles;
   rotating the steering shaft through the plurality of steering cycles, via the rotary actuator, in response to the steering control input; and
   determining, using the rotary actuator, a steering torque output, a steering angle output, and a lateral acceleration output corresponding to the steering control input, during rotation of the steering shaft through each of the plurality of steering cycles.

2. The method of claim 1, wherein the steering control input includes a steering angle input and a lateral acceleration input.

3. The method of claim 2, wherein:
   the lateral acceleration input is zero when the steering angle input is zero; and
   a steering wheel velocity at center is defined by a rotational velocity of the steering shaft when the steering angle input is zero;
   the method further comprising:
      determining the steering wheel velocity at center corresponding to the steering control input, via the simulator controller.

4. The method of claim 3, further comprising:
   varying the steering control input such that the plurality of steering cycles includes steering cycles generating a range of values of the steering wheel velocity at center.

5. The method of claim 4, further comprising:
   associating, using the simulator controller, the steering torque output, the steering angle output, and the lateral acceleration output received during each of the plurality of steering cycles with the corresponding steering control input for corresponding one of the plurality of steering cycles.

6. The method of claim 5, further comprising:
   grouping, using the simulator controller, the associated data of the plurality of steering cycles into a plurality of data groups, where each data group is defined by a common calculated mean steering control input.

7. The method of claim 6, further comprising:
   comparing each of the plurality of data groups, using the simulator controller, to an idealized input profile for the data group;
   identifying whether the data group includes a disqualifying steering cycle; and
   removing data associated with the disqualifying steering cycle from the data group.

8. The method of claim 7, further comprising:
   applying a data filter, using the simulator controller, to the remaining data in the data group, to generate filtered data.

9. The method of claim 8, wherein the filter is a fourth ($4^{th}$) order Butterworth filter.

10. The method of claim 8, further comprising:
    applying, using the simulator controller, at least one correction factor to the filtered data to correct the filtered data for a vehicle center of gravity, to generate corrected data.

11. The method of claim 10, further comprising:
    cross-correlating the corrected data, using the simulator controller, to determine the phase shift time between the lateral acceleration output and the steering angle output in each steering cycle of the plurality of steering cycles included in the corrected data.

12. The method of claim 11, further comprising:
    deconvoluting the corrected data for each steering cycle of the corrected data, by performing a circulate-shift of the lateral acceleration output relative to the steering angle output, to remove the phase shift time between the lateral acceleration output and the steering angle output for that steering cycle.

13. The method of claim 12, further comprising:
    generating, using the simulator controller, a deconvoluted hysteresis curve for each steering cycle of the corrected data;
    determining, using the deconvoluted hysteresis curve for each steering cycle, a counter-clockwise (CCW) steering torque at zero and a clockwise (CW) steering torque at zero for the respective steering cycle;
    associating the determined CCW steering torque at zero and the determined CW steering torque at zero for the respective steering cycle with the steering wheel velocity at center determined for that respective steering cycle.

14. The method of claim 13, further comprising:
    plotting, using the simulator controller, for each of the plurality of steering cycles of the corrected data, the determined CCW steering torque at zero and the determined CW steering torque at zero for the respective steering cycle with the steering wheel velocity at center determined for that respective at steering cycle.

15. The method of claim 14, further comprising:
    calculating for each of a plurality of predetermined values of steering wheel velocity at center, using the simulator controller, an average CW steering torque at zero and an average CCW steering torque at zero; and
    identifying, using the average CW steering torque at zero, the average CCW steering torque at zero, and the corresponding predetermined value of the steering wheel velocity of center of the plurality of predetermined values of steering wheel velocity at center, a best fit model;
    wherein the best-fit model quantifies the viscous damping steering feel characteristic of a vehicle including the EPS system.

16. A system for quantifying a viscous damping steering feel characteristic of an electric power steering (EPS) system including an EPS gear connected to a steering shaft, the system comprising:
    a simulator system including a rotary actuator and a simulator controller;

wherein the rotary actuator is connected to the EPS gear via the steering shaft;

wherein the simulator controller is programmed to transmit a steering control input to the rotary actuator to rotate the steering shaft through a plurality of steering cycles in response to the steering control input;

wherein the steering control input is a triangle wave defining the plurality of steering cycles; and wherein the simulator controller receives, from the rotary actuator, a steering torque output, a steering angle output, and a lateral acceleration output corresponding to the steering control input, during rotation of the steering shaft through each of the plurality of steering cycles.

17. The system of claim 16, further comprising:
the rotary actuator including a steering wheel angle sensor;
the EPS gear including an EPS steering angle sensor;
wherein the simulator controller receives the steering angle output from at least one of the steering wheel angle sensor and the EPS steering angle sensor.

18. The system of claim 16, wherein:
the steering control input includes a steering angle input and a lateral acceleration input;
the lateral acceleration input is zero when the steering angle input is zero;
a steering wheel velocity at center is defined by a rotational velocity of the steering shaft when the steering angle input is zero;
the simulator controller is programmed to:
    determine the steering wheel velocity at center corresponding to the steering control input for each of the plurality of steering cycles; and
    vary the steering control input such that the plurality of steering cycles includes steering cycles generating a range of values of the steering wheel velocity at center.

19. The system of claim 18, wherein the simulator controller is programmed to:
associate the steering torque output, the steering angle output, and the lateral acceleration output received during each of the plurality of steering cycles with the corresponding steering control input for corresponding one of the plurality of steering cycles;
determine the phase shift time between the lateral acceleration output and the steering angle output in each steering cycle of the plurality of steering cycles;
deconvolute each steering cycle to remove the phase shift time between the lateral acceleration output and the steering angle output for that steering cycle;
generate a deconvoluted hysteresis curve for each steering cycle;
determine, using the deconvoluted hysteresis curve for each steering cycle, a counter-clockwise (CCW) steering torque at zero and a clockwise (CW) steering torque at zero for the respective steering cycle;
associate the determined CCW steering torque at zero and the determined CW steering torque at zero for the respective steering cycle with the steering wheel velocity at center determined for that respective steering cycle;
calculate, for each of a plurality of predetermined values of steering wheel velocity at center an average CW steering torque at zero and an average CCW steering torque at zero; and
identify a best fit model using the average CW steering torque at zero, the average CCW steering torque at zero, and the corresponding predetermined value of the steering wheel velocity of center of the plurality of predetermined values of steering wheel velocity at center;
wherein the best fit model quantifies the viscous damping steering feel characteristic of a vehicle including the EPS system.

20. The system of claim 19, wherein the simulator controller is programmed to:
group the associated data of the plurality of steering cycles into a plurality of data groups, where each data group is defined by a common calculated mean steering control input;
compare each of the plurality of data groups to an idealized input profile for the data group;
identify whether the data group includes a disqualifying steering cycle;
remove data associated with the disqualifying steering cycle from the data group;
apply a data filter to the remaining data in the data group, to generate filtered data;
apply at least one correction factor to the filtered data to correct the filtered data for a vehicle center of gravity, to generate corrected data; and
use the corrected data to generate a best fit model.

* * * * *